(12) United States Patent  
Inaba

(10) Patent No.: US 12,492,753 B2  
(45) Date of Patent: Dec. 9, 2025

(54) VALVE SEAT UNIT

(71) Applicant: MAYEKAWA MFG. CO., LTD., Tokyo (JP)

(72) Inventor: Takashige Inaba, Tokyo (JP)

(73) Assignee: MAYEKAWA MFG. CO., LTD., Tokyo (JP)

( * ) Notice: Subject to any disclaimer, the term of this patent is extended or adjusted under 35 U.S.C. 154(b) by 0 days.

(21) Appl. No.: 18/716,321

(22) PCT Filed: Dec. 12, 2022

(86) PCT No.: PCT/JP2022/045612  
§ 371 (c)(1),  
(2) Date: Jun. 4, 2024

(87) PCT Pub. No.: WO2023/120269  
PCT Pub. Date: Jun. 29, 2023

(65) Prior Publication Data  
US 2025/0035216 A1   Jan. 30, 2025

(30) Foreign Application Priority Data

Dec. 20, 2021 (JP) ................................. 2021-206296

(51) Int. Cl.  
*F16K 1/42*  (2006.01)  
*F04B 39/10*  (2006.01)

(52) U.S. Cl.  
CPC .......... *F16K 1/427* (2013.01); *F04B 39/1086* (2013.01)

(58) Field of Classification Search  
CPC ............ F16K 1/42–427; F04B 39/1086; F05C 2201/00; F05C 2253/20  
See application file for complete search history.

(56) References Cited

U.S. PATENT DOCUMENTS

| 5,511,583 A | 4/1996 | Bassett |
| 2019/0234230 A1* | 8/2019 | Nishiyama ............ F01D 17/145 |

FOREIGN PATENT DOCUMENTS

| CN | 116201931 A | * | 6/2023 | ............ F16K 15/03 |
| FR | 1545386 A | * | 11/1968 | |
| FR | 2331729 A1 | * | 6/1977 | |
| JP | S58111385 U | | 7/1983 | |
| JP | H09158878 A | | 6/1997 | |
| JP | H10512945 A | | 12/1998 | |

OTHER PUBLICATIONS

International Search Report issued in Intl. Appln. No. PCT/JP2022/045612, mailed Feb. 7, 2023. English translation provided.  
Written Opinion issued in Intl. Appln. No. PCT/JP2022/045612, mailed Feb. 7, 2023.

* cited by examiner

*Primary Examiner* — Marina A Tietjen  
(74) *Attorney, Agent, or Firm* — ROSSI, KIMMS & McDOWELL LLP

(57) ABSTRACT

A valve seat unit according to an embodiment of the present disclosure, includes: a base; a valve seat including a seat surface for a valve to sit on and configured separately from the base; and a bolt securing the valve seat to the base. A head portion of the bolt is located between the seat surface and a seat back surface of the valve seat located opposite to the seat surface.

6 Claims, 4 Drawing Sheets

VALVE SEAT UNIT

TECHNICAL FIELD

The present disclosure relates to a valve seat unit.

BACKGROUND

A valve seat unit for seating a valve is known. In Patent Document 1, a seat plate as a valve seat for seating a discharge valve of a compressor is formed integrally with a cylinder.

CITATION LIST

Patent Literature

Patent Document 1: JPH9-158878A

SUMMARY

Technical Problem

However, in the above-described patent document, when the valve seat plate is replaced for reasons of, for example, wear, etc., the cylinder needs to be replaced together with the seat plate, and the cylinder may be subject to disposal. In seeking a solution thereto, it is required that seating performance of the discharge valve is not impaired.

An object of the present disclosure is to provide a valve seat unit that can reduce the number of parts to be disposed of in replacement work and can stably seat the valve.

Solution to Problem

A valve seat unit according to at least one embodiment of the present disclosure, includes: a valve seat including a seat surface for a valve to sit on and a seat back surface located opposite to the seat surface; a base configured separately from the valve seat and supporting the valve seat; and a bolt securing the valve seat to the base. A head portion of the bolt is located between the seat surface and the seat back surface.

Advantageous Effects

According to the present disclosure, it is possible to provide a valve seat unit that can reduce the number of parts to be disposed of in replacement work and can stably seat the valve.

DETAILED DESCRIPTION

Figure 1:
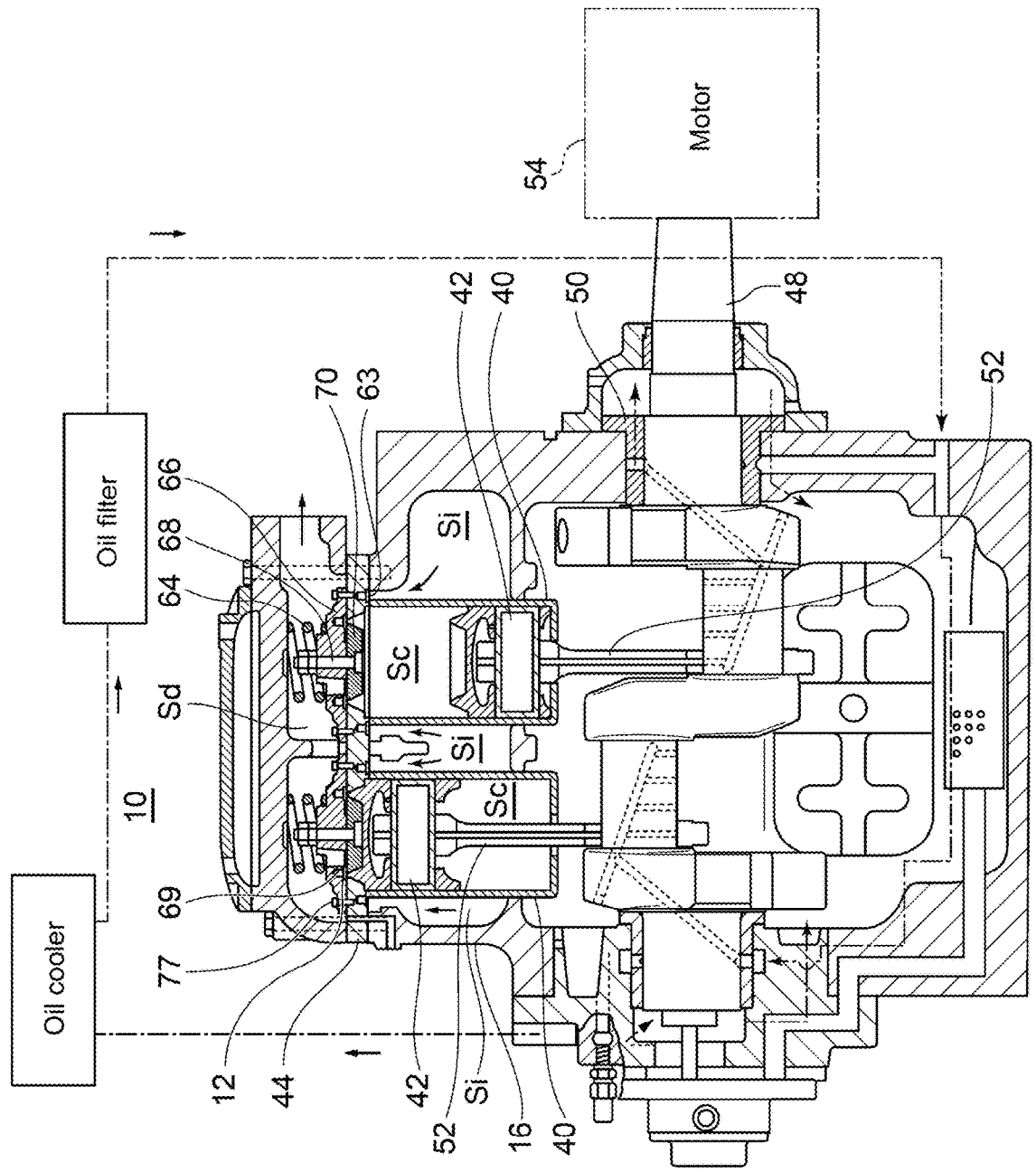
FIG. 1 is a conceptual cross-sectional view of a reciprocating compressor according to an embodiment.

Some embodiments of the present disclosure will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including" or "having" one constitutional element is not an exclusive expression that excludes the presence of other constitutional elements.

The same configurations are indicated by the same reference characters and may not be described again in detail.

1. OVERVIEW OF RECIPROCATING COMPRESSOR 10

FIG. 1 is a conceptual cross-sectional view of a reciprocating compressor 10 (hereinafter, may be referred to as the "compressor 10") according to an embodiment of the present disclosure. The compressor 10 is incorporated into a refrigeration cycle including a plurality of heat exchangers, for example, a condenser and an evaporator. As the refrigeration cycle, a binary refrigeration cycle, a two-stage compression refrigeration cycle, a reverse Brayton refrigeration cycle, or the like can be given. In this case, a gas compressed by the compressor 10 is a refrigerant gas.

In another embodiment, the compressor 10 may be incorporated into an internal combustion engine, etc. and a gas compressed by the compressor 10 may be a combustion gas, etc.

The compressor 10 according to an embodiment of the present disclosure includes a crankcase 16 and a plurality of cylinders 40 housed in the crankcase 16. Each cylinder 40 internally forms a cylinder chamber Sc where a piston 42 is housed. Each piston 42 is connected to a crank shaft 48, which is supported by a bearing 50 disposed in the crankcase 16, via a connecting rod 52, etc. Further, one end of the crank shaft 48 is connected to a motor 54, and each piston 42 can reciprocate inside each cylinder 40 when driven by the motor 54.

In the exemplary embodiment shown in FIG. 1, two cylinders 40 are disposed in parallel, and the pistons 42 in the two cylinders 40 are connected to the crank shaft 48 so as to reciprocate in phases different by 180° at a rotation angle of the crank shaft 48.

In the following description, the axial direction of the cylinder 40 may simply be referred to as the "axial direction". In the present embodiment, the axial direction coincides with the vertical direction, and the crank shaft 48 extends in the horizontal direction.

On one end side of the cylinder 40 (an upper end side of the cylinder 40 in FIG. 1), a mechanism for supporting a discharge valve 12 is mounted. This mechanism includes a valve plate 44, a valve seat 110C (see FIG. 3) which is separate from the valve plate 44, and a discharge valve seat 70 in truncated conical shape disposed inside an opening formed in the valve plate 44. The discharge valve seat 70 is coupled to a valve cage 66 by a bolt 68, and the discharge valve 12 is held between the discharge valve seat 70 and the valve cage 66. Further, the valve cage 66 is biased toward the cylinder 40 by a head spring 64. Further, the discharge valve 12 is biased toward valve seat 110C and the discharge valve seat 70 by a valve spring (not shown) housed in a spring hole 69 disposed in the valve cage 66.

The compressor 10 according to an embodiment of the present disclosure further includes an intake valve 63 disposed around the cylinder chamber Sc of the cylinder 40, and a valve seat 110A (see FIG. 2A) as an intake valve seat, which is configured to seat the intake valve 63. The intake valve 63 has an O-ring shape extending continuously over the circumferential direction with the axis of the cylinder 40 as a reference. In another embodiment, the intake valve 63 may be a plurality of plate valves arranged along the circumferential direction.

An overview of an operation of the compressor 10 shown in FIG. 1 is as follows.

When the piston 42 is lowered and a closed space in the cylinder chamber Sc is depressurized as the motor 54 is driven, a pressure in an intake space Si formed outside the cylinder 40 exceeds the pressure in the closed space by a certain degree. The intake valve 63 seated on the valve seat 110A (see FIG. 2A) is pushed up, and a gas in the intake space Si is sucked into the cylinder chamber Sc through the valve seat 110A. Thereafter, the piston 42 finishes its descent and begins to rise. As a result of the gas being compressed by the piston 42 and the closed space being pressurized, the intake valve 63 is pushed down and seated on the valve seat 110A. When the piston 42 rises further and the pressure in the closed space exceeds a pressure in a discharge space Sd by a certain degree, the discharge valve 12 is pushed up and the compressed gas in the cylinder chamber Sc is discharged to the discharge space Sd. When the piston 42 then begins to descend, the pressure in the closed space of the cylinder chamber Sc is reduced, and the discharge valve 12 is biased by a valve spring and is seated on the valve seat 110C and the discharge valve seat 70.

2. VALVE SEAT UNIT 20

Figure 2A:
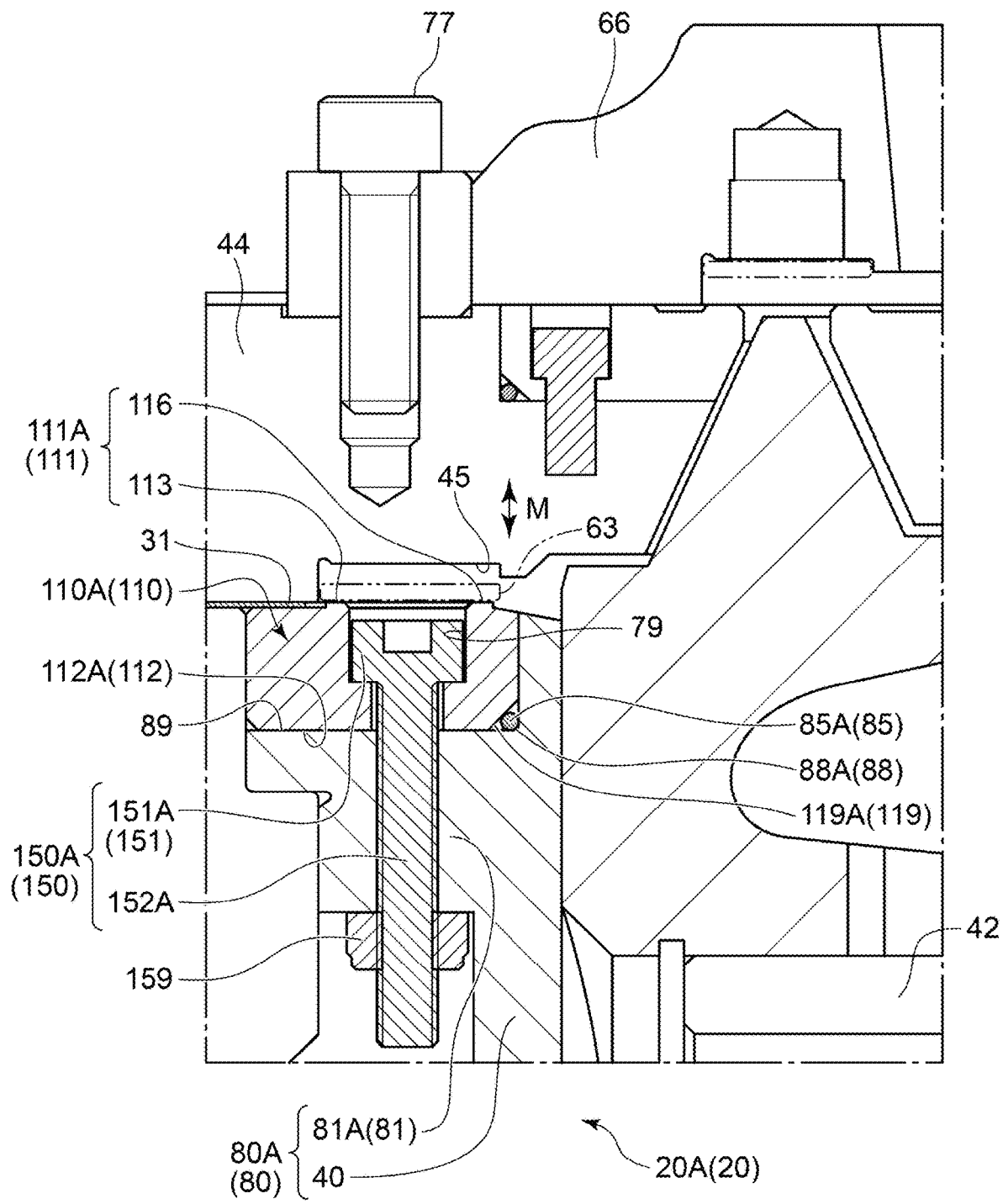
FIG. 2A is a conceptual view of a valve seat unit according to an embodiment for an intake valve.
Figure 2B:
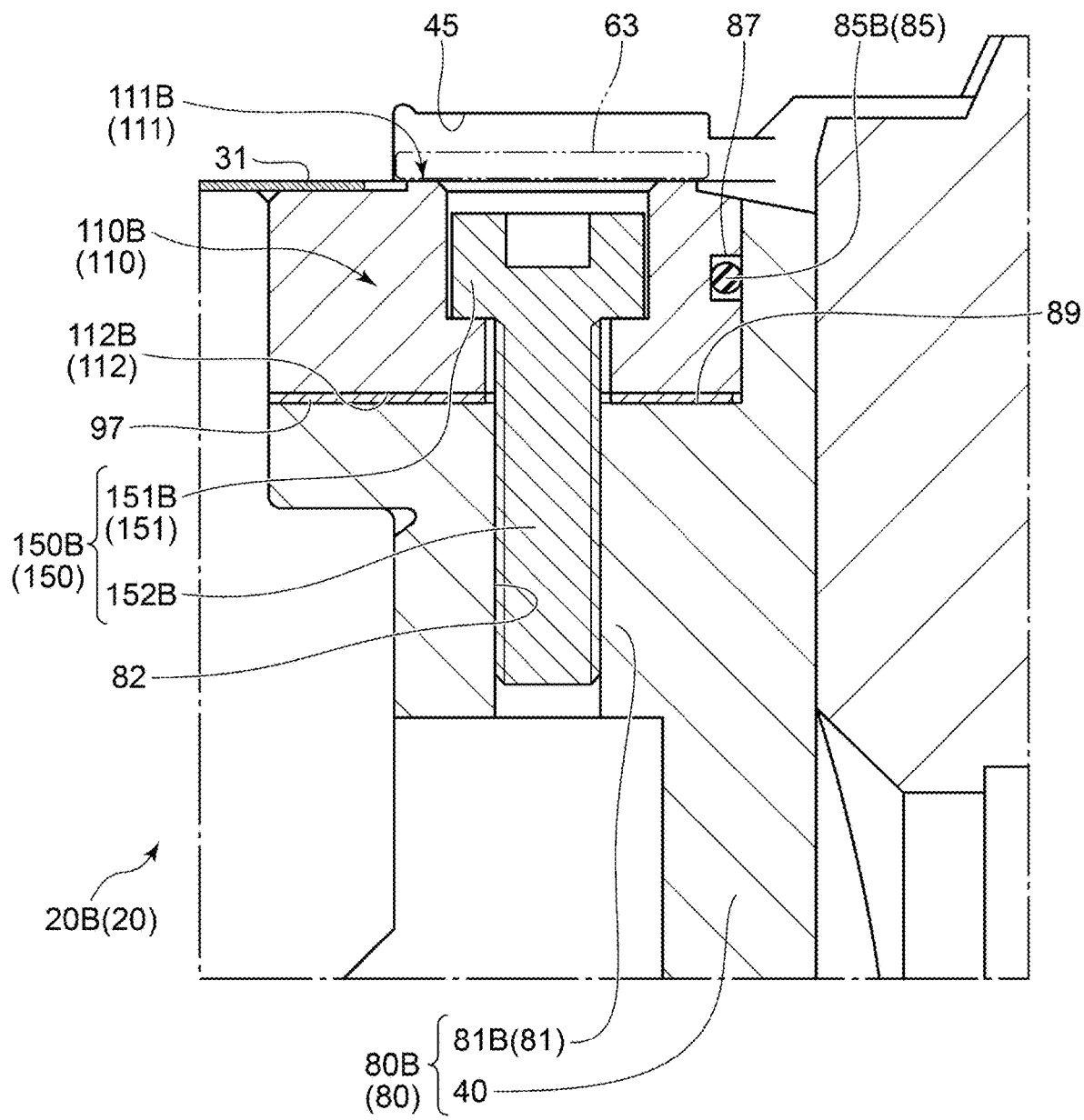
FIG. 2B is a conceptual view of a valve seat unit according to another embodiment for the intake valve.
Figure 3:
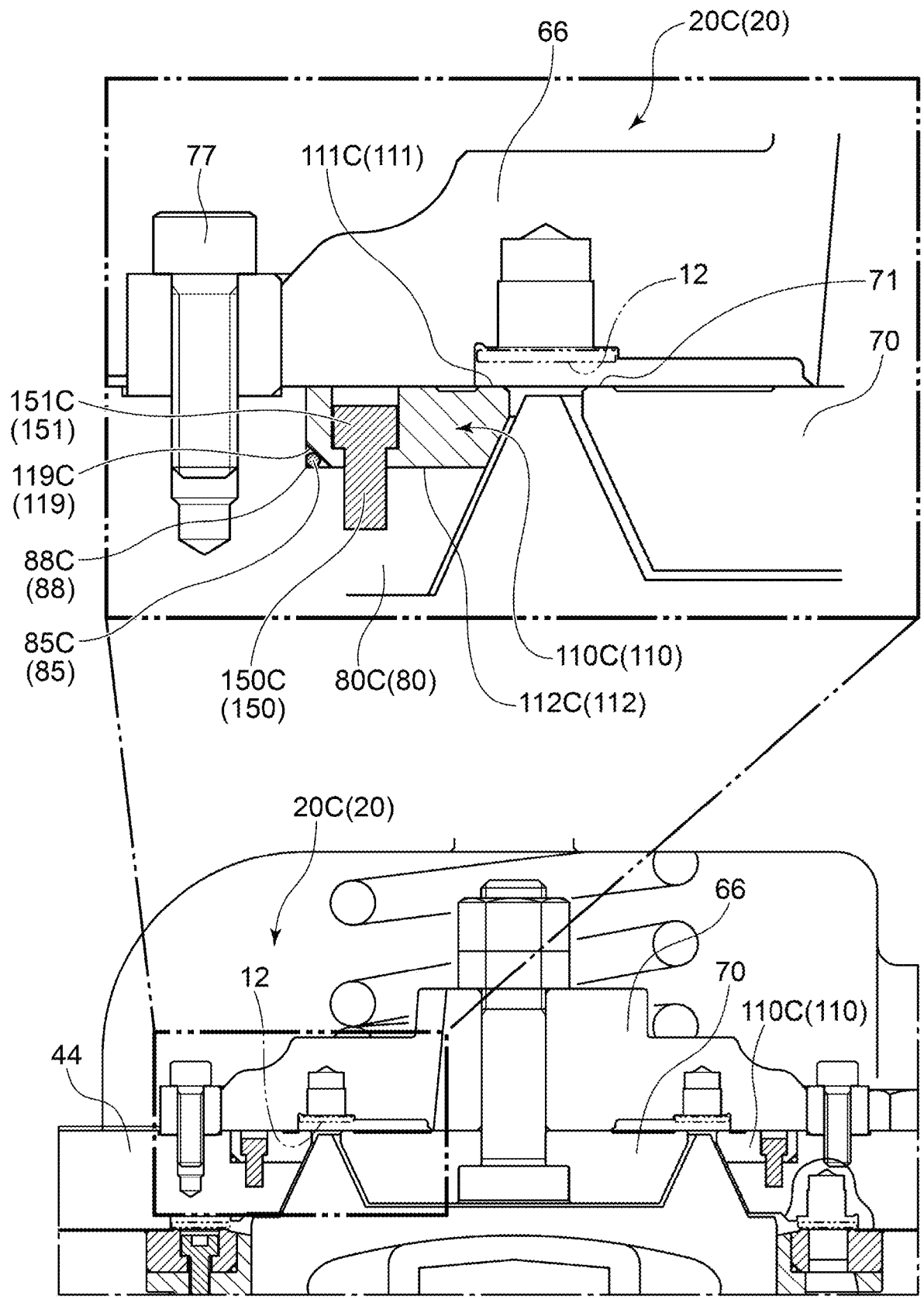
FIG. 3 is a conceptual view of a valve seat according to an embodiment for a discharge valve.

Details of a valve seat unit 20 which is a component of the compressor 10 will be exemplified with reference to FIGS. 2A, 2B and 3. The valve seat unit 20 according to an embodiment of the present disclosure is a unit for seating the valve (the intake valve 63 or the discharge valve 12). Hereinafter, valve seat units 20A, 20B for seating the intake valve 63 will be described with reference to FIGS. 2A, 2B, respectively, and a valve seat unit 20C for seating the discharge valve 12 will be described with reference to FIG. 3. Further, in the following description, the valve seat units 20A to 20C may collectively be referred to as the "valve seat unit 20".

<2-1. Details of Valve Seat Unit 20A for Intake Valve>

Details of the valve seat unit 20A according to an embodiment for the intake valve will be exemplified with reference to FIG. 2A. In FIG. 2A, some components are illustrated without hatching for convenience of viewing the drawing (the same also applies to FIGS. 2B, 3).

The valve seat unit 20A includes a valve seat 110A (110) having a seat surface 111A (111) for the intake valve 63 to sit on, a base 80A (80) configured separately from the valve seat 110A, a bolt 150A (150) securing the valve seat 110A to the base 80A, and a gasket 31 interposed between the valve seat 110A and the valve plate 44. The seat surface 111A is formed in an O-ring shape, as an example.

The base 80A of the present embodiment includes the above-described cylinder 40 and a flange 81A formed integrally with the cylinder 40. Further, the valve seat 110A includes a seat back surface 112A (112) located opposite to the seat surface 111A. The base 80A of the present embodiment has a flange 81A in contact with the seat back surface 112, and this flange 81A supports the valve seat 110A. The bolt 150A secures the valve seat 110A to the flange 81A. A shaft portion 152A of the bolt 150A in the present example penetrates the flange 81A, and a nut 159 is screwed to the shaft portion 152A protruding from the flange 81A. By screwing the nut 159, a head portion 151A of the bolt 150 presses the valve seat 110A against the flange 81A, thereby fixing the valve seat 110A to the flange 81A.

The head portion 151A of the bolt 150A in the present embodiment is arranged at an axial position between the seat surface 111A and the seat back surface 112A. As a more specific example, the entire head portion 151A is housed in a recessed portion 79 disposed in the valve seat 110A. The shaft portion 152A of the bolt 150A described above is inserted into a through hole formed in the bottom of the recessed portion 79. The recessed portion 79 according to an embodiment is formed integrally with the seat surface 111A and is recessed toward the seat back surface 112A.

A back seat 45 formed in the valve plate 44 is disposed in line with the above-described seat surface 111A in the axial direction, and the intake valve 63 is configured to move between the back seat 45 and the seat surface 111A (arrow M). A spring may be disposed between the intake valve 63 and the back seat 45 (that is, the intake valve 63 may not be in direct contact with the back seat 45). The back seat 45 is located on an inner side of the gasket 31 formed in an annular shape.

Details of an operation of seating the intake valve 63 on the valve seat 110A having the above configuration are as follows. When the closed space of the cylinder 40 is pressurized as the piston 42 rises, the intake valve 63 having been pushed up moves toward the seat surface 111A. When at least part of the intake valve 63 contacts the seat surface 111A, various forces act on the intake valve 63. For example, when the axis of the intake valve 63 is inclined with respect to the vertical direction (not shown), the intake valve 63 rotates on its own axis with a portion of one side of the intake valve 63 sliding against the seat surface 111A (as the intake valve 63 rotates on its own axis, the portion of the one side of the intake valve 63, which is in contact with the seat surface 111A, may change). Then, when the momentum of the rotation of the intake valve 63 on its own axis weakens, the intake valve 63 comes to rest and is seated on the seat surface 111A.

By seating the intake valve 63, the valve seat 110A exhibits a gas sealing function. That is, the valve seat 110A makes the intake space Si and the closed space of the cylinder 40 non-communicative with each other, and restricts gas flow between the two spaces.

Since the head portion 151A is located between the seat surface 111A and the seat back surface 112A, the intake valve 63 does not contact the head portion 151A during the seating process and therefore, the head portion 151A does not affect the seating of the intake valve 63.

As described above, since a frictional force is generated between the intake valve 63 and the valve seat 110A, the valve seat 110A may fail due to wear, etc. if the compressor 10 is operated for a long period of time. In this case, the valve seat 110A is replaced. For example, the specific replacement work is as follows.

First, the valve plate 44, the gasket 31, and the intake valve 63 are removed in sequence. Thereafter, the nut 159 is loosened and the bolt 150A is removed. Whereby, the valve seat 110A is removed from the base 80A and replaced with a new valve seat 110A. Thereafter, the new valve seat 110A is placed on the base 80A, and the bolt 150A, the nut 159, the intake valve 63, the gasket 31, and the valve plate 44 are assembled in sequence, completing the replacement work. In the above-described replacement work, the valve seat 110A including the cylinder 40 may be removed from the crankcase 16 before the nut 159 is loosened.

According to the above configuration, even if the valve seat 110A fails, the valve seat 110A can be removed from the base 80A by removing the bolt 150A and replaced with another valve seat 110A. That is, the base 80A need not be replaced. Whereby, the base 80A can be excluded from parts to be disposed of as a result of the replacement work, making it possible to reduce the number of parts to be disposed of. Further, since the head portion 151A of the bolt 150A is located between the seat surface 111A and the seat back surface 112A, the bolt 150A does not affect the seating of the intake valve 63 in the valve seat 110A. In view of the above, the valve seat 110A is achieved which can reduce the number of parts to be disposed of in the replacement work and can stably seat the intake valve 63.

In the embodiment illustrated in FIG. 2A, the base 80A includes a support surface 89 in contact with the seat back surface 112A of the valve seat 110A. The support surface 89 in direct contact with the seat back surface 112A supports the valve seat 110A. According to the above configuration, since the support surface 89 is in direct contact with the seat back surface 112A, a seating position of the intake valve 63 can easily be controlled. More specifically, the seating position of the intake valve 63 can be set to a desired position simply by controlling respective shapes of the base 80A and the valve seat 110A during a manufacturing process. Therefore, stable seating of the intake valve 63 can easily be achieved.

In the embodiment illustrated in FIG. 2A, the valve seat 110A formed in a ring shape includes a chamfered portion 119A (119) connected to one radial end (an inner end in the present example) of the seat back surface 112A. Further, the base 80 includes a base corner portion 88A (88) facing the chamfered portion 119. Then, an O-ring 85A (85) which is a component of the valve seat 110A of the present embodiment is disposed between the chamfered portion 119A and the base corner portion 88A. The O-ring 85A is in close contact with the chamfered portion 119A and the base corner portion 88A. According to the above configuration, the simple configuration where the O-ring 85A is arranged between the chamfered portion 119A and the base corner portion 88A allows the valve seat 110A to stably exhibit the gas sealing function. For example, a gas compressed in the closed space of the cylinder 40 can be restricted from passing between the valve seat 110A and the base 80A.

In the embodiment illustrated in FIG. 2A, the seat surface 111A includes an inner seat 116 formed in an annular shape and an outer seat 113 formed in an annular shape so as to surround the inner seat 116. Then, the bolt 150A (150) is located between the inner seat 116 and the outer seat 113. In other words, the recessed portion 79 accommodating the head portion 151A of the bolt 150A is arranged at a radial position between the inner seat 116 and the outer seat 113. According to the above configuration, a space between the inner seat 116 and the outer seat 113 is utilized as the arrangement space for the bolt 150A, the valve seat 110A can be made more compact compared to a case where the bolt 150A is arranged on an opposite side of the outer seat 113 from the inner seat 116 (i.e., the radially outside of the outer seat 113).

In the present embodiment, the intake valve 63 is formed by a metal material, as an example. A material of the valve seat 110A may be the same as or different from the material of the intake valve 63. For example, at least one of the intake valve 63 and the valve seat 110A may be formed of steel. Further, the hardness of the intake valve 63 may be higher or lower than the hardness of the valve seat 110A.

The valve seat 110A according to some embodiments is formed by a metal material. According to the above configuration, deformation of the valve seat 110A is suppressed even when a fastening force associated with fastening of the bolt 150A acts on the valve seat 110A. Whereby, a seating position of the intake valve 63 in the axial direction can be set to a desired position. Therefore, it is possible to suppress a variation in seating position of the intake valve 63 before and after the valve seat 110A is replaced.

Further, the valve seat 110A according to some embodiments is formed by a resin material. There is a high risk of failure in the compressor 10 if the intake valve 63 wears and breaks due to friction caused between the intake valve 63 and the valve seat 110A. In more details, the valve seat 110A may not be able to exhibit its sealing function if debris generated from the intake valve 63 is chewed between the intake valve 63 and the seat surface 111A. Another risk is that the cylinder 40 and the piston 42 may break if the debris from the intake valve 63 enters into the cylinder 40 and gets caught between the piston 42 and an inner surface of the cylinder 40.

In this regard, according to the above configuration, even if friction occurs between the intake valve 63 and the valve seat 110A as the compressor 10 operates, wear occurs more easily on the valve seat 110 than on the intake valve 63 since the valve seat 110A is made of resin, suppressing defects caused by the wear on the intake valve 63. Thus, the compressor 10 can stably be operated over a long period of time without any of the above-described failure.

<2-2. Details of Valve Seat Unit 20B for Intake Valve>

Details of the valve seat unit 20B according to another embodiment for the intake valve will be exemplified with reference to FIG. 2B. In FIG. 2B, the same components as those in FIG. 2A are indicated by the same reference signs. Hereinafter, the configuration of the valve seat unit 20B, which is different from the valve seat unit 20A (see FIG. 2A) will be described.

The valve seat unit 20B includes a valve seat 110B (110), a base 80B (80) supporting the valve seat 110B, and a bolt 150B (150) securing the valve seat 110B to the base 80B. A head portion 151B (151) of the bolt 150B is located between a seat surface 111B and a seat back surface 112B, which are components of the valve seat 110B. In the example of FIG. 2B, a fastening hole 82 into which a shaft portion 152B of the bolt 150B is screwed is formed in a flange 81B of the base 80B.

The valve seat unit 20B of the present embodiment includes a gasket 97. The gasket 97 is interposed between a support surface 89 of the flange 81B and the seat back surface 112B of the valve seat 110B, and is made of metal as an example. Further, a groove 87 is formed in an inner peripheral surface of the valve seat 110B over the entire length in the circumferential direction, and an O-ring 85B (85) is arranged inside the groove 87. The O-ring 85B is in close contact with the inner peripheral surface of the valve seat 110B and the outer peripheral surface of the cylinder 40, and restricts the gas from passing between the valve seat 110B and the cylinder 40.

According to the above configuration, in work of replacing the valve seat 110B with another valve seat 110B, there is no need to remove the nut 159 (FIG. 2A) exemplified in the valve seat unit 20A. That is, there is no need for a worker to reach an opposite side (vertically lower side) of the flange 81B from the valve seat 110B with his or her hand or tool. Whereby, since the work of removing the cylinder 40 from the crankcase 16, which is exemplified in the valve seat unit 20A, is no longer essential, the replacement work can be made easier.

<2-3. Details of Valve Seat Unit 20C for Intake Valve>

The valve seat unit 20C (20) for the discharge valve will be described with reference to FIG. 3. The valve seat unit 20C includes the previously-described discharge valve seat 70 and the valve seat 110C (110) configured separately from the valve plate 44. The discharge valve seat surface 71 of the discharge valve seat 70 and a seat surface 111C of the valve seat 110C both function as seats for the discharge valve 12 to sit on. In the following description, for convenience, the valve plate 44 having the function of supporting the valve seat 110C may be referred to as a "base 80C". The valve seat 110C (110) of the present embodiment includes a bolt 150C (150) securing the valve seat 110C to the base 80C (80). A head portion 151C (151) of the bolt 150C is arranged at an axial position between the seat surface 111C and a seat back surface 112C (112) of the valve seat 110C.

The discharge valve 12 may wear as with the intake valve 63. Specifically, when the discharge valve 12 moves toward the discharge valve seat 70 and the valve seat 110C as the closed space of the cylinder 40 is depressurized, the axis of the discharge valve 12 may be inclined with respect to the vertical direction. At this time, the discharge valve 12 rotates on its own axis such that a portion of one side of the discharge valve 12 slides against the valve seat 110C, which may cause the one side of the discharge valve 12 to wear out and fail.

When the discharge valve 12 fails, work is performed to replace the discharge valve 12 with another discharge valve 12. Specifically, after the valve cage 66 is removed, the bolt 150C is loosened and the valve seat 110C is removed from the base 80C. Whereby, the valve seat 110C is replaced with another valve seat 110C, and the base 80C need not be replaced.

In the embodiment illustrated in FIG. 3, the valve seat 110C formed in a ring shape includes a chamfered portion 119C (119) connected to one radial end (an outer end in the present example) of the seat back surface 112C, and the base 80C includes a base corner portion 88C (88) facing the chamfered portion 119C. The valve seat unit 20C of the present embodiment includes an O-ring 85C (85) disposed between the chamfered portion 119C and the base corner portion 88C. The O-ring 85C is in close contact with the valve seat 110C and the base corner portion 88C, and functions to seal a portion between the valve seat 110 and the base corner portion 88C to prevent the gas from passing through.

3. CONCLUSION

The contents described in some embodiments described above would be understood as follows, for instance.

1) A valve seat unit (20) according to at least one embodiment of the present disclosure, includes: a valve seat (110) including a seat surface (111) for a valve (intake valve 63, discharge valve 12) to sit on and a seat back surface (112) located opposite to the seat surface; a base (80) configured separately from the valve seat and supporting the valve seat; and a bolt (150) securing the valve seat to the base. A head portion (151) of the bolt is located between the seat surface and the seat back surface.

According to the above configuration 1), even if the valve seat fails, the failed valve seat can be removed from the base by removing the bolt and replaced with another valve seat. That is, the base need not be replaced. Whereby, the base can be excluded from parts to be disposed of in the replacement work, making it possible to reduce the number of parts to be disposed of. Further, since the head portion of the bolt is located between the seat surface and the seat back surface, the bolt does not affect the seating of the valve in the valve seat. In view of the above, the valve seat unit is achieved which can reduce the number of parts to be disposed of in the replacement work and can stably seat the valve.

2) In some embodiments, the valve seat unit according to the above 1), wherein the base includes a support surface (89) in contact with the seat back surface and supporting the valve seat.

According to the above configuration 2), since the support surface of the base is in direct contact with the seat back surface, a seating position of the valve can easily be controlled. More specifically, the seating position of the valve can be set to a desired position simply by controlling respective shapes of the base and the valve seat. Therefore, stable seating of the valve can easily be achieved.

3) In some embodiments, the valve seat unit according to the above 2), wherein the valve seat formed in a ring shape further includes a chamfered portion (119) connected to one radial end of the seat back surface, wherein the base further includes a base corner portion (88) facing the chamfered portion, and wherein the valve seat unit further includes an O-ring (85) disposed between the base corner portion and the chamfered portion.

According to the above configuration 3), the simple configuration where the O-ring is arranged between the chamfered portion and the base corner portion allows the valve seat unit to stably exhibit the gas sealing function. For example, during a process in which a compressor incorporating the valve seat unit compresses a gas, the valve seat unit can suppress passage of the compressed gas through between the valve seat and the base.

4) In some embodiments, the valve seat unit according to any of the above 1) to 3), wherein the seat surface has: an inner seat (116) formed in an annular shape; and an outer seat (113) formed in an annular shape so as to surround the inner seat, and wherein the bolt is located between the inner seat and the outer seat.

According to the above configuration 4), a space between the inner seat and the outer seat is utilized as the arrangement space for the bolt, the valve seat unit can be made more compact compared to a case where the bolt is arranged on an opposite side of the outer seat surface from the inner seat.

5) In some embodiments, the valve seat according to any of the above 1) to 4), wherein the valve seat is formed by a metal material.

According to the above configuration 5), deformation of the valve seat is suppressed when the bolt is fastened, making it possible to set the seating position of the valve to a desired position. Therefore, it is possible to suppress a variation in seating position of the valve before and after the valve seat is replaced.

6) In some embodiments, the valve seat according to any of the above 1) to 5), wherein the valve seat is formed by a resin material.

There is a high risk of failure in the compressor incorporating the valve seat unit, if the valve wears and breaks due to friction caused between the valve and the valve seat. In this regard, according to the above configuration 6), even if friction occurs between the valve and the valve seat as the compressor operates, wear on the valve is suppressed since the valve seat is made of resin. Thus, the compressor can stably be operated over a long period of time without any failure.

REFERENCE SIGNS LIST

20: Valve seat unit
80: Base
85A: O-ring
85B: O-ring
85C: O-ring
87: Groove
88: Base corner portion
89: Support surface
110: Valve seat
111: Seat surface
112: Seat back surface
113: Outer seat
116: Inner seat
119: Chamfered portion
150: Bolt
151: Head portion

The invention claimed is:

1. A valve seat unit, comprising:
a valve seat including a seat surface for a valve to sit on and a seat back surface located opposite to the seat surface;
a base configured separately from the valve seat and supporting the valve seat; and
a bolt securing the valve seat to the base,
wherein a head portion of the bolt is located between the seat surface and the seat back surface,
wherein the base includes a support surface in contact with the seat back surface and supporting the valve seat,
wherein the valve seat formed in a ring shape further includes a chamfered portion connected to one radial end of the seat back surface,
wherein the base further includes a base corner portion facing the chamfered portion, and
wherein the valve seat unit further comprises an O-ring disposed between the base corner portion and the chamfered portion.

2. The valve seat unit according to claim 1,
wherein the seat surface has:
an inner seat formed in an annular shape; and
an outer seat formed in an annular shape so as to surround the inner seat, and
wherein the bolt is located between the inner seat and the outer seat.

3. The valve seat unit according to claim 1,
wherein the valve seat is formed by a metal material.

4. The valve seat unit according to claim 1,
wherein the valve seat is formed by a resin material.

5. A reciprocating compressor, comprising:
a cylinder which internally forms a cylinder chamber;
a piston housed in the cylinder chamber and capable of reciprocating inside the cylinder;
an intake valve disposed around the cylinder chamber;
a ring-shaped intake valve seat including a seat surface for the intake valve to be seated on, and a seat back surface located opposite to the seat surface;
a base configured separately from the intake valve seat and supporting the intake valve seat from a side of the seat back surface; and
a bolt securing the intake valve seat to the base,
wherein the seat surface includes:
an inner seat formed in an annular shape; and
an outer seat formed in an annular shape so as to surround the inner seat, the intake valve being configured to seat on both of the inner seat and the outer seat, and
wherein the intake valve seat has a recessed portion for housing a head portion of the bolt between the inner seat and the outer seat such that the head portion is located between the seat surface and the seat back surface, the recessed portion facing the annular intake valve.

6. The reciprocating compressor according to claim 5,
wherein the base includes a flange formed integrally with the cylinder.

* * * * *